United States Patent
McDannald

(10) Patent No.: US 8,564,390 B1
(45) Date of Patent: Oct. 22, 2013

(54) TAPERED NEEDLE PLUG FOR BLEED PORT ON FLOAT OPERATED PNEUMATIC VALVE ASSEMBLY

(75) Inventor: Kenny McDannald, Broken Arrow, OK (US)

(73) Assignee: Kenco International, Inc., Tulsa, OK (US)

( * ) Notice: Subject to any disclaimer, the term of this patent is extended or adjusted under 35 U.S.C. 154(b) by 0 days.

(21) Appl. No.: 13/360,358

(22) Filed: Jan. 27, 2012

Related U.S. Application Data

(60) Provisional application No. 61/453,725, filed on Mar. 17, 2011.

(51) Int. Cl.
*H01H 9/00* (2006.01)

(52) U.S. Cl.
USPC .......................................... 335/205; 335/207

(58) Field of Classification Search
USPC ........................................................ 335/207
See application file for complete search history.

(56) References Cited

U.S. PATENT DOCUMENTS

| | | | |
|---|---|---|---|
| 1,745,762 A | 2/1930 | Honiss | |
| 1,894,367 A | 1/1933 | Corcoran | |
| 2,076,591 A * | 4/1937 | Rhodes et al. | 73/54.07 |
| 2,113,345 A | 4/1938 | Haymond | |
| 2,636,508 A | 4/1953 | Resek et al. | |
| 2,752,932 A | 7/1956 | Newboult | |
| 2,893,427 A | 7/1959 | Felgate | |
| 2,944,562 A * | 7/1960 | Glasgow et al. | 137/270 |
| 3,506,028 A * | 4/1970 | Kmiecik et al. | 137/412 |
| 3,710,613 A * | 1/1973 | Innes et al. | 335/205 |
| 3,822,933 A | 7/1974 | Johnson | |
| 3,858,602 A * | 1/1975 | Brym | 137/423 |
| 3,970,099 A | 7/1976 | Murphy, Jr. et al. | |
| 4,481,389 A * | 11/1984 | Johnson | 200/84 C |
| 4,543,979 A | 10/1985 | Olmsted et al. | |
| 4,557,071 A | 12/1985 | Fah | |
| 4,577,657 A | 3/1986 | Alexander | |
| 4,865,073 A | 9/1989 | Kocher | |
| 5,080,126 A * | 1/1992 | De Rycke et al. | 137/209 |
| 6,820,763 B2 | 11/2004 | Bilskie et al. | |
| 7,412,988 B1 * | 8/2008 | Alexander | 137/446 |

* cited by examiner

*Primary Examiner* — Elvin G Enad
*Assistant Examiner* — Lisa Homza
(74) *Attorney, Agent, or Firm* — Head, Johnson & Kachigian, P.C.

(57) ABSTRACT

A float operated liquid level switch having a body, a float assembly, a switch magnet, and a needle plug. The float assembly may be pivotally attached to the body at a pivot axis. The float assembly may have a first end and a second end opposite the first end, where the pivot axis is located between the first end and the second end. The float assembly may further comprise a float attached to the first end and a float magnet attached to the second end, such that raising the float causes the float magnet to lower and lowering the float causes the float magnet to rise. The switch magnet may be responsive to movement of the float magnet, and the needle plug may be responsive to movement of the switch magnet.

8 Claims, 3 Drawing Sheets

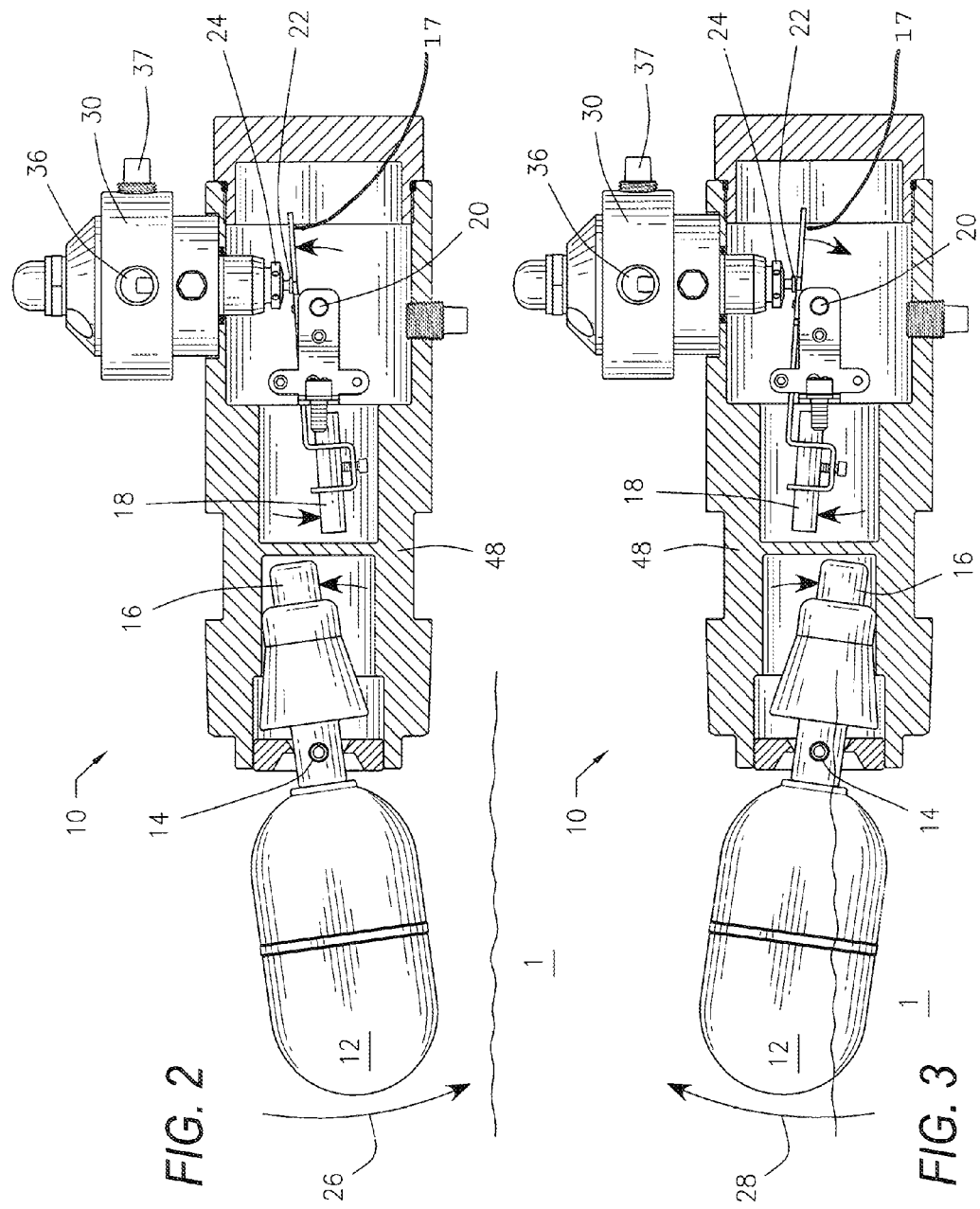

TAPERED NEEDLE PLUG FOR BLEED PORT ON FLOAT OPERATED PNEUMATIC VALVE ASSEMBLY

CROSS REFERENCE

This application is based on and claims priority to U.S. Provisional Patent Application Ser. No. 61/453,725, which was filed on Mar. 17, 2011.

BACKGROUND OF THE INVENTION

1. Field of the Invention

The present invention relates to a tapered needle plug for a bleed port on a float operated pneumatic valve assembly for a pneumatic operated liquid level switch for tanks and vessels.

2. Description of the Related Art

There are a number of existing devices that include float operated valves. In each case, when the liquid level rises or falls in a tank or vessel, a float shifts a pneumatic valve to one of two positions. Some existing devices couple the float to the pneumatic valve using a magnet couple while others use mechanical linkage.

Some existing devices control the pneumatic valve by a pad or flap. Large forces are required to seal such a pad or flap, requiring the use of a powerful magnet where magnet coupling is used.

Based on the foregoing, it is desirable to provide a float operated pneumatic valve utilizing a tapered needle plug instead of a pad or flap. This would reduce the force needed to seal the port, which in turn makes the pneumatic valve more reliable and allows for lower operating specific gravities. It also means the coupling used to connect the float to the valve does not have to supply as much force, which makes for more coupling options, such as a weaker magnetic coupling.

Some existing pneumatic conical or tapered valves with a magnetic switch are direct acting, such as seen in Felgote (U.S. Pat. No. 2,893,427). It is desirable to provide a magnetic opposing pole snap switch with a block and bleed valve arrangement.

It would also be desirable to provide a tapered needle plug for a bleed port on a float operated pneumatic valve assembly wherein a block and bleed valve is externally adjustable.

SUMMARY OF THE INVENTION

In general, in a first aspect, the invention relates to a float operated liquid level switch having a body, a float assembly, a switch magnet, and a needle plug. The float assembly may be pivotally attached to the body at a pivot axis. The float assembly may have a first end and a second end opposite the first end, where the pivot axis is located between the first end and the second end. The float assembly may further comprise a float attached to the first end and a float magnet attached to the second end, such that raising the float causes the float magnet to lower and lowering the float causes the float magnet to rise. The switch magnet may be responsive to movement of the float magnet, and the needle plug may be responsive to movement of the switch magnet.

The switch magnet may be responsive to movement of the float magnet such that lowering the float magnet causes the switch magnet to rise and raising the float magnet causes the switch magnet to lower. Likewise, the needle plug may be responsive to movement of the switch magnet such that raising the switch magnet causes the needle plug to lower and lowering the switch magnet causes the needle plug to rise. Raising the float may cause the needle plug to lower and lowering the float may cause the needle plug to rise.

The switch magnet may be housed within the body. The float operated liquid level switch may further comprise a block and bleed valve controlled by the needle plug. The block and bleed valve may be a pneumatic valve.

In a second embodiment, a float operated liquid level switch comprises a body, a float assembly, a switch magnet assembly, a needle valve, and a block and bleed valve. The float assembly may be pivotally attached to the body at a pivot axis. The float assembly may have a first end and a second end opposite the first end, where the pivot axis is located between the first end and the second end. The float assembly may further comprise a float attached to the first end and a float magnet attached to the second end, such that raising the float causes the float magnet to lower and lowering the float causes the float magnet to rise. The switch magnet assembly may be pivotally attached to the body via a pivot shaft. The switch magnet assembly may comprise a first end and a second end opposite the first end, where the pivot shaft is located between the first end and the second end. The switch magnet assembly may further comprise a switch magnet attached to the first end and located proximate the float magnet, where the switch magnet and the float magnet have like poles such that they repel each other. The needle valve may comprise a needle plug, where the needle plug is attached to the second end of the switch magnet assembly. The block and bleed valve may be controlled by the needle valve.

The switch magnet assembly may be housed within the body. The block and bleed valve may have a seat assembly that is externally adjustable. The block and bleed valve may be a pneumatic valve.

BRIEF DESCRIPTION OF THE DRAWINGS

FIG. 2 is a side view of the pneumatic operated liquid level switch assembly shown in FIG. 1 with the float in a lowered position;

FIG. 3 is a side view of the pneumatic operated liquid level switch assembly shown in FIG. 1 with the float in a raised position.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the present invention relates to a pneumatic operated liquid level switch assembly 10 for tanks and vessels used in a wide variety of industrial applications.

Figure 1:
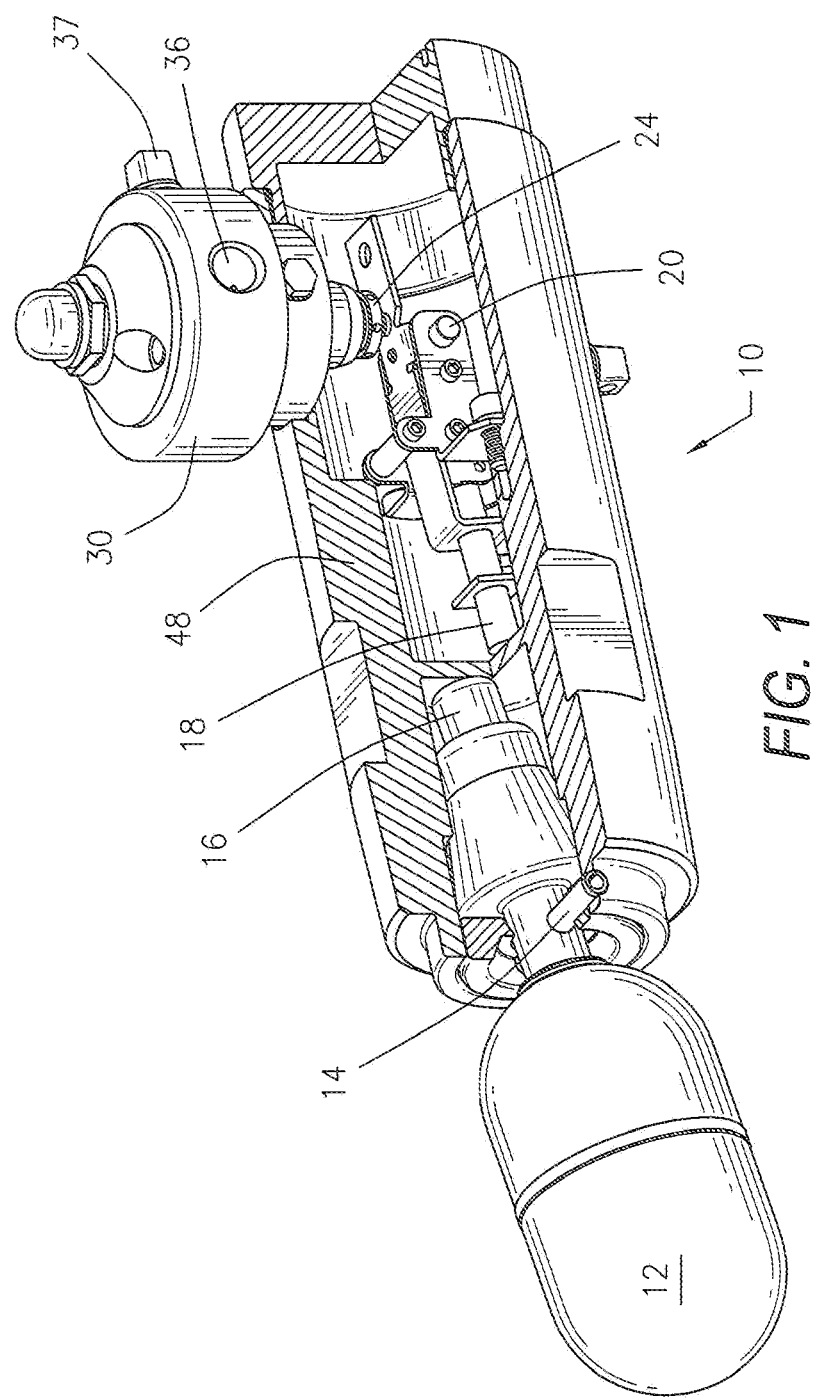
FIG. 1 is a perspective view of a pneumatic operated liquid level switch assembly constructed in accordance with the present invention.

As seen in FIGS. 1 through 3, a float 12 may be in fluid communication with liquid 1 in a tank or vessel (not shown) and will move down when the liquid level decreases, as shown by arrow 26, or up when the liquid level increases, as shown by arrow 28. The float 12 may pivot around a pivot axis 14. At the opposite end of the pivot axis 14 may be a float magnet 16. Movement of the float 12 may result in reciprocal movement of the float magnet 16. The switch 10 may include a switch body 48 near the float magnet 16. Within the switch body 48 may be a switch magnet 18, which generates repelling magnet forces. The switch magnet 18 may revolve around a pivot shaft 20 which translates into movement of an arm 17 to move a needle plug 22. The needle plug 22 may be part of a valve seat assembly 24, which controls a block and bleed valve assembly 30.

Figure 4:
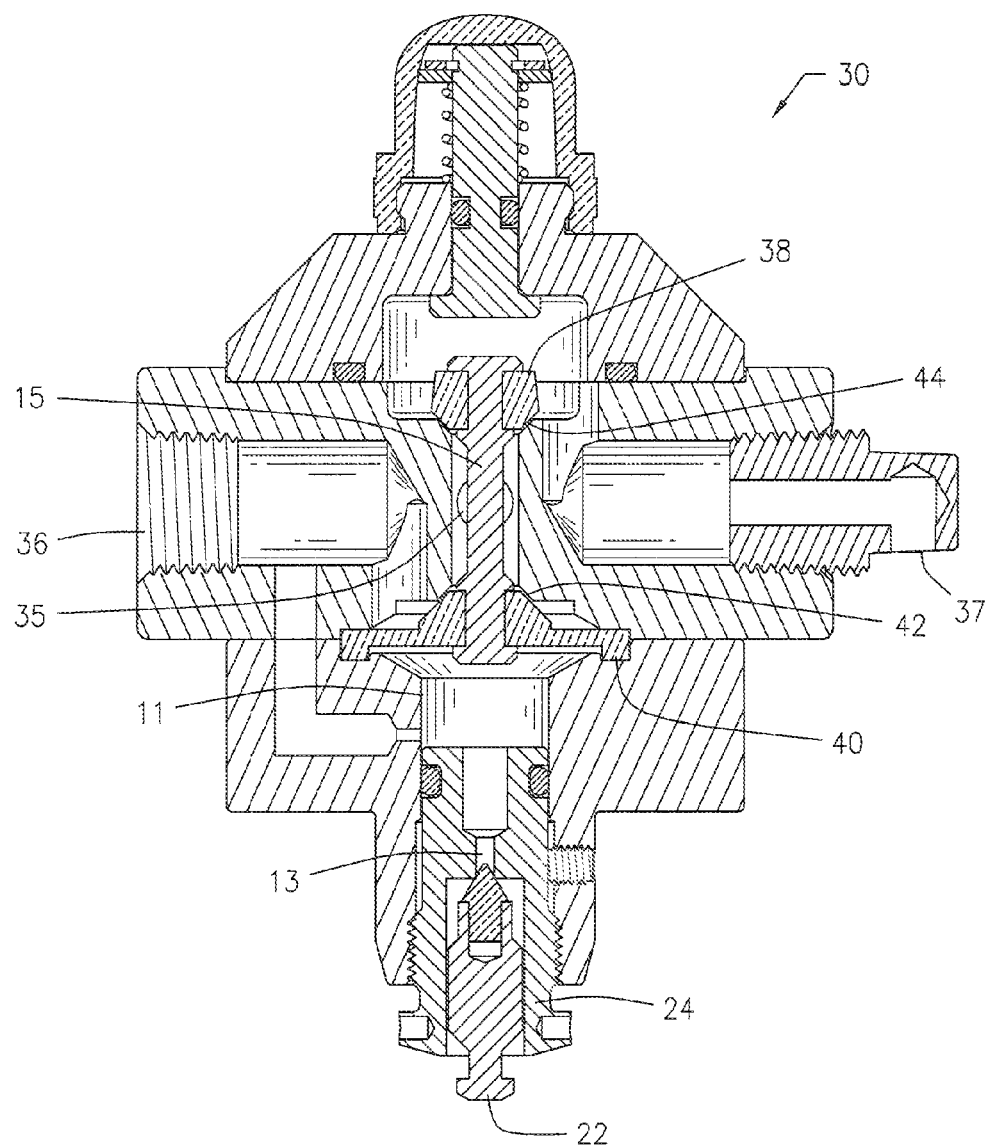
FIG. 4 is a cut-away view of a block and bleed valve assembly.

The block and bleed valve assembly 30, shown in a cutaway view in FIG. 4, may be a pneumatic valve assembly. A diaphragm shaft or pin 15 may be movable within a chamber in the body of a valve assembly 30. The valve assembly 30 may be a two position three-way valve. The valve assembly 30 may be supplied with pressurized air or other pressurized gas through an inlet port 36. An upper seal and a diaphragm 40 each extend radially from the diaphragm pin. The inlet port 36 is in fluid communication with a chamber 11 that communicates with a bleed port 13 in a valve seat assembly 24.

The diaphragm 40 has a top side and an opposed bottom side. When the bleed port is blocked by the tapered needle plug 22, gas flowing through the inlet 36 may pressurize both the top side and bottom side of the diaphragm 40. The bottom of the diaphragm 40 may have a larger surface area than the top. The larger surface area provided by the bottom of the diaphragm 40 may force the diaphragm 40 upward, shifting the diaphragm and the pin 15 up and shifting the diaphragm 40 into the diaphragm seat 42. This may seal off the lower seat 42 and at the same time open up the upper seat 44, thereby connecting the outlet port 35 to the exhaust port 37 and blocking the inlet port. This would be considered one position of the two position valve.

Movement of the needle plug 22 by movement of the switch magnet 18 may move the valve to an alternate position. When the bleed port is open by retraction of the tapered needle plug 22 by moving the tapered needle away from the bleed port, the bottom of the diaphragm 40 may be depressurized. Since the top of the diaphragm 40 continues to receive pressured air from the gas through the inlet port 36, a positive force may be created in the downward direction, shifting the diaphragm 40 and pin 15 downward and the upper seal 38 into the upper seat 44. This may seal the upper seat 44 and open the lower seat thereby connecting the inlet port to the outlet port 35 and blocking the exhaust port 37. This would be considered position two of the two position valve.

An optional externally adjustable seat assembly (not shown) may reside within an optional threaded opening (not shown) in the valve portion 30. The seat assembly may have external threads that mate with threads on the valve portion 30. Rotation of the seat assembly may cause advancement or retraction of the seat assembly within the valve portion 30.

Whereas, the devices and methods have been described in relation to the drawings, it should be understood that other and further modifications, apart from those shown or suggested herein, may be made within the spirit and scope of this invention.

What is claimed is:

1. A float operated liquid level switch comprising:
   a body;
   a float assembly pivotally attached to the body at a pivot axis, the float assembly comprising:
      a first end;
      a second end opposite the first end, where the pivot axis is located on a line directly between the first end and the second end;
      a float attached to the first end;
      a float magnet attached to the second end, such that raising the float causes the float magnet to lower and lowering the float causes the float magnet to rise;
   a switch magnet responsive to movement of the float magnet;
   an arm extending from said switch magnet wherein said arm and said switch magnet pivot about a pivot shaft, and wherein movement of said switch magnet translates into rotational movement of said arm;
   a tapered needle plug receivable in a bleed port in a valve seat assembly responsive to movement of the arm; and
   a pneumatic block and bleed valve assembly controlled by movement of the tapered needle plug.

2. The float operated liquid level switch of claim 1 where the switch magnet is responsive to movement of the float magnet such that lowering the float magnet causes the switch magnet to rise and raising the float magnet causes the switch magnet to lower.

3. The float operated liquid level switch of claim 1 where the needle plug is responsive to movement of the switch magnet such that raising the switch magnet causes the needle plug to lower and lowering the switch magnet causes the needle plug to rise.

4. The float operated liquid level switch of claim 1 where raising the float causes the needle plug to lower and lowering the float causes the needle plug to rise.

5. The float operated liquid level switch of claim 1 where the switch magnet is housed within the body.

6. A float operated liquid level switch comprising:
   a body;
   a float assembly pivotally attached to the body at a pivot axis, the float assembly comprising:
      a first end;
      a second end opposite the first end, where the pivot axis is located on a line directly between the first end and the second end;
      a float attached to the first end; and
      a float magnet attached to the second end, such that raising the float causes the float magnet to lower and lowering the float causes the float magnet to rise;
   a switch magnet assembly pivotally attached to the body via a pivot shaft, the switch magnet assembly comprising:
      a first end;
      a second end opposite the first end, where the pivot shaft is located between the first end and the second end wherein the first end and the second end pivot about a pivot shaft;
      a switch magnet attached to the first end and located proximate the float magnet, where the switch magnet and the float magnet have like poles such that they repel each other wherein movement of the switch magnet translates into rotational movement of said second end;
   a needle valve comprising a tapered needle plug receivable in a bleed port in a valve seat assembly, where the needle plug is attached to the second end of the switch magnet assembly so that movement of the second end results in movement of the needle valve; and
   a pneumatic block and bleed valve assembly controlled by movement of the needle valve.

7. The float operated liquid level switch of claim 6 where the switch magnet assembly is housed within the body.

8. The float operated liquid level switch of claim 6 where the block and bleed valve has a seat assembly that is externally adjustable.

\* \* \* \* \*